(12) United States Patent
Otsuki (10) Patent No.: US 7,363,021 B2
(45) Date of Patent: Apr. 22, 2008

(54) COMMUNICATION MANAGEMENT SYSTEM, MOBILE TERMINAL DEVICE, AND COMMUNICATION MANAGEMENT PROGRAM

(75) Inventor: Kazunori Otsuki, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 73 days.

(21) Appl. No.: 10/529,927

(22) PCT Filed: Oct. 3, 2003

(86) PCT No.: PCT/JP03/12721

§ 371 (c)(1),
(2), (4) Date: Apr. 1, 2005

(87) PCT Pub. No.: WO2004/032378

PCT Pub. Date: Apr. 15, 2004

(65) Prior Publication Data

US 2006/0063547 A1   Mar. 23, 2006

(30) Foreign Application Priority Data

Oct. 3, 2002   (JP) ............................. 2002-290848

(51) Int. Cl.
*H04Q 7/20* (2006.01)

(52) U.S. Cl. ...................... 455/410; 455/411; 455/418; 455/405

(58) Field of Classification Search ................... None
See application file for complete search history.

(56) References Cited

U.S. PATENT DOCUMENTS

2003/0061364 A1* 3/2003 Banerjee et al. ............ 709/229
2004/0072557 A1* 4/2004 Paila et al. .............. 455/414.1

FOREIGN PATENT DOCUMENTS

| JP | 1996 8294170 | 11/1996 |
|----|--------------|---------|
| JP | 10-004584 | 1/1998 |
| JP | 2000 347846 | 12/2000 |
| JP | 2001-184545 | 7/2001 |
| JP | 2002-111910 | 4/2002 |
| JP | 2002-510446 | 4/2002 |
| JP | 2002 368669 | 12/2002 |
| JP | 2003 264871 | 9/2003 |

* cited by examiner

*Primary Examiner*—Erika A. Gary
(74) *Attorney, Agent, or Firm*—Ladas & Parry LLP (57) ABSTRACT

A mobile terminal includes an official PAN chip for managing communication executed on the PAN. The official PAN chip permits only a proper PAN application to execute communication on the PAN by a certification function, and makes the execution of the application possible. Further, the official PAN chip collects status information of the communication executed on the PAN, and suitably reports it to a license server arranged by a mobile telecommunication carrier. The license server executes management of the PAN communication using the mobile phone and charges the fee based on the status information.

6 Claims, 6 Drawing Sheets

| MOBILE TERMINAL USER ID | PAN APPLICATION ID | PACKET AMOUNT (bit) | COMMUNICATION TIME (Sec) | OBTAINING TIME |
|---|---|---|---|---|
| 1234567890 | ABCABC | 5855258 | 366625 | 2002/01/01 10:10:10~ |
| 1234567890 | BCCCBB | 455255 | 28666 | 2002/01/03 22:10:25 |
| ... | ... | ... | ... | ... |

FIG. 6

COMMUNICATION MANAGEMENT SYSTEM, MOBILE TERMINAL DEVICE, AND COMMUNICATION MANAGEMENT PROGRAM

The present application claims priority to Japanese patent application number 2002-290848 filed on Oct. 3, 2002 and to the international patent application under PCT number PCT/JP2003/012721 filed on Oct. 3, 2003, which are incorporated herein by their references in its entirety.

TECHNICAL FIELD

The present invention relates to a communication management technique of a narrow area wireless network such as a personal area network in a communication environment including a narrow area wireless network (personal area network) constructed by a wide area network of a mobile telecommunication carrier and mobile communication terminals.

BACKGROUND TECHNIQUE

A mobile telecommunication carrier such as a mobile phone company supplies a communication service by utilizing an original wide area network, and a user thereof can receive the service by using a mobile communication terminal such as a mobile phone. As one of such communication services, there is a service for connecting the mobile phone of the user to the Internet, in addition to a normal call service. Namely, by operating the mobile phone, the user can connect the mobile phone to the Internet via the network of the mobile telecommunication carrier, and can receive a service of downloading contents from various Web servers and a service of using a specific application.

On the other hand, there is proposed a wireless communication system within a range of communication distance of several tens of meters, which is called "Personal Area Network", and there is a movement to load such a short distance wireless communication function into the mobile communication terminal such as the mobile phone. If such the short distance wireless communication function is loaded into the mobile communication terminal, free information communication becomes possible between the mobile communication terminals on which the same wireless communication function is loaded, freely and without management system, without passing through the network of the mobile telecommunication carrier.

Since the wireless communication by using such short distance wireless communication function does not pass through the network of the mobile telecommunication carrier, the mobile telecommunication carrier cannot grasp the information communication of the user, and has no way to charge. Therefore, the mobile telecommunication carrier gets no benefit by loading such wireless communication function into the mobile communication terminal. What is even worse, if the information communication is executed between the users via such the wireless communication function and the network of the mobile telecommunication carrier is not used, it becomes rather disadvantageous for the mobile telecommunication carrier to load the wireless communication function into the mobile communication terminal.

On the other hand, if the loading of the wireless communication function on the mobile communication terminal is prevented due to the above reason, the spread of the wireless communication function itself is also prevented, which may cause disadvantage of the user.

DISCLOSURE OF INVENTION

The present invention has been achieved in order to solve the above problems. It is an object of this invention to provide a communication management system capable of making a mobile telecommunication carrier network and a narrow area wireless communication network such as a personal area network compatible with each other in a form of avoiding disadvantage of a mobile telecommunication carrier.

According to one aspect of the present invention, there is provided a communication management system including: a server device; and a mobile terminal device capable of communicating with the server device via a mobile telecommunication carrier network, wherein the mobile terminal device includes: a wireless communication unit which communicates with another terminal device by wireless communication without passing through the mobile telecommunication carrier network an application which executes a process including the wireless communication by the wireless communication unit; and a control unit which determines whether or not the application is proper, and permits an execution of the wireless communication by the application only when the application is proper.

According to the above communication management system, the mobile terminal device such as the mobile phone can communicate with the server device via the mobile telecommunication carrier network, and can further execute the wireless communication with another terminal device without passing through the mobile telecommunication carrier network by the wireless communication unit included therein. The application for executing the process including the wireless communication is loaded into the mobile terminal device. In executing the application on the mobile terminal, the control unit determines whether or not the application is proper, and permits the execution of the application, i.e., the execution of the wireless communication only when the application is proper. Conversely, when the application is not proper, the control unit inhibits the execution of the application, i.e., the execution of the wireless communication. Thereby, only the proper application is executed on the mobile terminal device, and the execution of the wireless communication is permitted. The execution of the wireless communication by the mobile terminal device based on an illegal application can be limited.

In a manner of the above communication management system, the control unit may include: a communication amount detecting unit which detects a packet communication amount of the wireless communication by the wireless communication unit; and a status information transmission unit which obtains status information indicating an execution condition of the wireless communication and having identification information of the mobile terminal device, identification information of the application and the packet communication amount, and transmits the status information to the server device via the mobile telecommunication carrier network, and the server device may generate accounting information relating to the wireless communication by the mobile terminal device based on the status information.

According to the manner, the status information including the information of the packet communication amount of the wireless communication executed by the mobile terminal device is transmitted from the mobile terminal device to the server device. Therefore, the server device can generate the charging information relating to the wireless communication based on the status information, and thereby the mobile telecommunication carrier can charge the fee.

According to another aspect of the present invention, there is provided a mobile terminal device capable of communicating with a server device via a mobile telecommunication carrier network, including: a wireless communication unit which communicates with another terminal device by wireless communication without passing through the mobile telecommunication carrier network; an application which executes a process including the wireless communication by the wireless communication unit; and a control unit which determines whether or not the application is proper, and permits an execution of the wireless communication by the application only when the application is proper.

According to the above mobile terminal device, the mobile terminal device such as the mobile phone can communicate with the server device via the mobile telecommunication carrier network, and can further execute wireless communication with another terminal device without passing through the mobile telecommunication carrier network by the wireless communication unit included therein. The application for executing the process including the wireless communication is loaded into the mobile terminal device. In executing the application on the mobile terminal, the control unit determines whether or not the application is proper, and permits the execution of the application, i.e., the execution of the wireless communication only when the application is proper. Conversely, when the application is not proper, the control unit inhibits the execution of the application, i.e., the execution of the wireless communication. Thereby, only the proper application is executed on the mobile terminal device, and the execution of the wireless communication is permitted. The execution of the wireless communication by the mobile terminal device based on the illegal application can be limited.

In a manner of the above mobile terminal device, the application may include certification information indicating that the application is proper, and the control unit may use the certification information to determine whether or not the application is proper. Thereby, the control unit of the mobile terminal device can refer the certification information included in the application and can rapidly and securely determine whether or not the application is proper.

In another manner of the above mobile terminal device, the control unit may include a status information transition unit which obtains status information indicating an execution condition of the wireless communication and transmits the status information to the server device via the network mobile telecommunication carder network. Thereby, when the wireless communication is executed by using the mobile terminal device based on the proper application, the execution condition of the wireless communication is reported to the server device as the status information. Therefore, the server device can grasp and manage the execution condition of the wireless communication by using the mobile terminal device. In addition, the mobile telecommunication carrier and the like can charge predetermined fee by using the status information.

In another manner of the above mobile terminal device, the control unit may include a communication amount detecting unit which detects a packet communication amount of the wireless communication by the wireless communication unit, and the status information transmission unit may transmit the status information having identification information of the mobile terminal device, identification information of the application and the packet communication amount. Thereby, the status information obtained by the control unit can be transmitted to the server device such as a PAN license server. Since the server device can grasp the identification information of the application necessitating the execution of the wireless communication and the communication amount by the wireless communication for each mobile terminal device, the management of the execution of the application and the charging of the fee can easily be performed.

According to another aspect of the present invention, there is provided a communication management program executed in a mobile terminal device capable of communicating with a server device via a mobile telecommunication carrier network and communicating with another terminal device by wireless communication without passing through the mobile telecommunication carrier network, making the mobile terminal device function as a control unit which determines whether or not an application loaded into the mobile terminal device for executing a process with the wireless communication is proper, and permits an execution of the wireless communication by the application only when the application is proper. By executing the program on the above mobile terminal device, the above communication management can be executed.

According to another aspect of the present invention, there is provided an mobile terminal device capable of communicating with a server device via a mobile telecommunication carrier network, including: a wireless communication unit which communicates with another terminal device by wireless communication without passing through the mobile telecommunication carrier network; an application which executes a process including wireless communication by the wireless communication unit; and an execution unit which executes the application.

According to the above mobile terminal device, the mobile terminal device such as the mobile phone can communicate with the server device via the mobile telecommunication carrier network, and can further execute wireless communication with another terminal device without passing through the mobile telecommunication carrier network by the wireless communication unit included therein. The mobile terminal device includes the application for executing the process including the wireless communication, and can execute the application by using the wireless communication without passing through the mobile telecommunication carrier network. In addition, the mobile terminal device can obtain the above application via the mobile telecommunication carrier network.

DETAILED DESCRIPTION OF THE PREFERRED EMBODIMENTS

The preferred embodiments of the present invention will now be described below with reference to the attached drawings. In the system of the present invention, a short distance wireless communication function such as Bluetooth (Registered Trademark) is loaded into a mobile communication terminal such as a mobile phone, and the communication function makes it possible that a narrow area wireless communication network (personal area network) independent of a network of the mobile telecommunication carrier is constructed between the mobile communication terminals. By obtaining wireless communication information between the users using the mobile communication terminals from their mobile communication terminals, the mobile telecommunication carrier can manage the communication condition in the narrow area wireless communication network (personal area network) and can make necessary charge.

[Configuration of Communication System]

Figure 1:
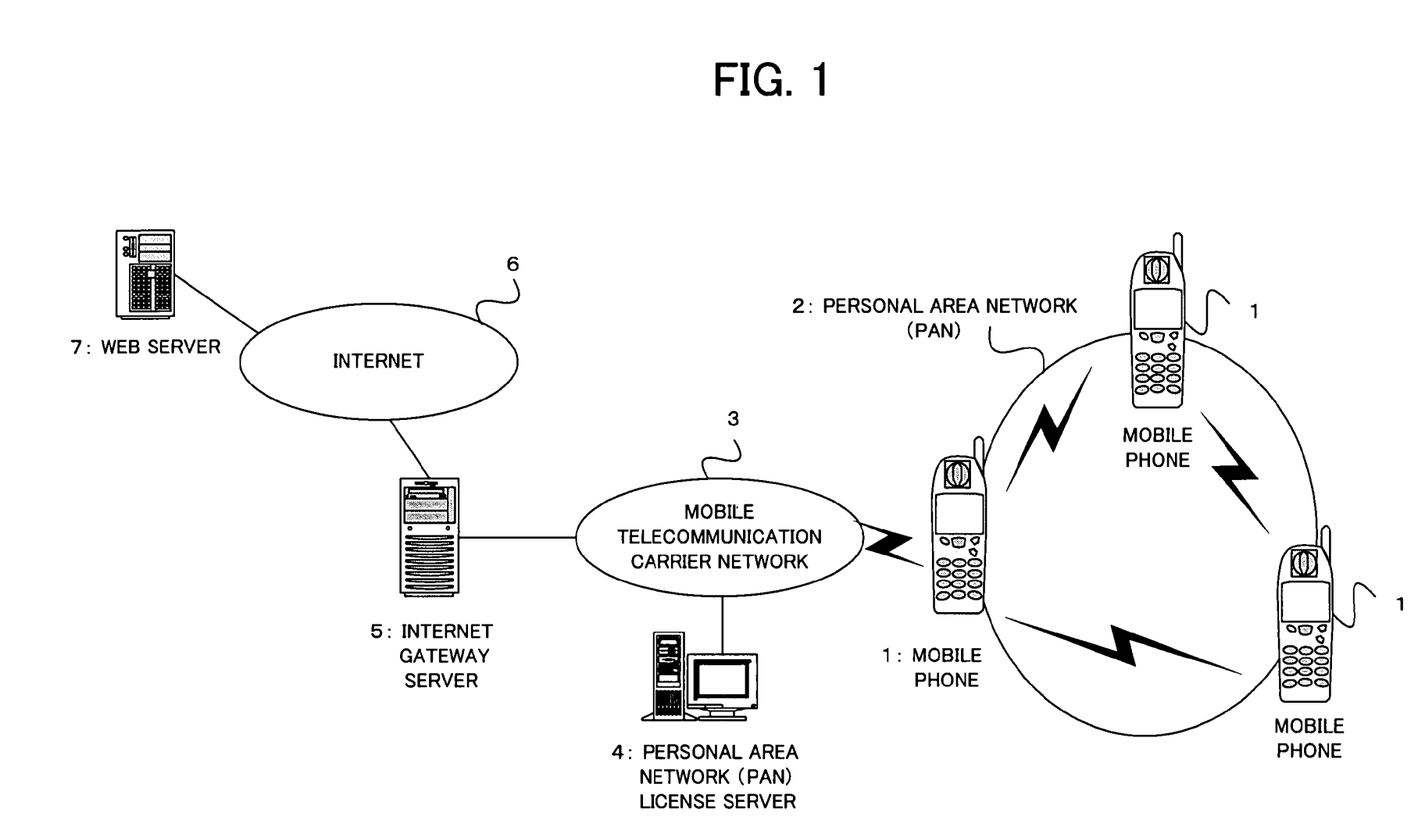
FIG. 1 is a diagram schematically showing a configuration of a communication management system of the present invention.

FIG. 1 is an example of an environment in which the present communication system is implemented. The mobile telecommunication carrier has its own mobile telecommunication carrier network 3. By a mobile phone 1 being a typical example of the mobile communication terminal, the user can receive a service such as a phone call to another mobile phone 1 via the mobile telecommunication carrier network 3. The mobile telecommunication carrier network 3 is connected to the Internet 6 via an Internet gateway server (hereinafter referred to as "gateway server") 5. The user of the mobile phone 1 can connect the mobile phone 1 to the Internet 6 via the mobile telecommunication carrier network 3 and the gateway server 5 provided on the mobile telecommunication carrier network, and can receive an information providing service supplied by various Web servers 7. In this case, the mobile telecommunication carrier can obtain, on the gateway server 5, communication information such as a number of connections of the mobile phone 1 to the Web server 7 on the Internet and an information packet amount that the mobile phone 1 received from the Web server 7 on the Internet. Therefore, the mobile telecommunication carrier can charge, to the user of the mobile phone 1, the necessary fee of the information communication executed by the user via the mobile telecommunication carrier network 3.

On the other hand, the mobile phone 1 includes the short distance wireless communication function whose communication range is several tens of meters, for example. Between the plural mobile phones 1, the wireless communication becomes possible by the short distance wireless communication function included in each mobile phone 1 without passing through the mobile telecommunication carrier network 3. Thereby, a personal area network (PAN) 2 independent of the mobile telecommunication carrier network 3 is configured. Therefore, by using the mobile phone 1, the user can execute the wireless communication with another mobile phone 1 included in the PAN 2.

Since the PAN 2 is independent of the wireless telecommunication carrier network 3, the user of the mobile phone 1 can execute the information communication with another user via the PAN 2, with no charge and restriction. Therefore, in the system of the present invention, a limit is put on the information communication of the mobile phone 1 on the PAN 2, and a unit by which the mobile telecommunication carrier can collect information about the information communication of the mobile phone 1 on the PAN 2 is provided. This is hereinafter called "PAN management function". The PAN management function limits unrestricted information communication of the mobile phone 1 of the user on the PAN 2. Also, the PAN management function makes it possible that the mobile telecommunication carrier charges the necessary fee of the information communication executed by the mobile phone 1 on the PAN 2. Concretely, this will be realized, if a unit which manages the communication of the PAN 2 is included in the mobile phone 1 and an personal area network license server (hereinafter, referred to as "license server") 4 is arranged on the mobile telecommunication carrier network 3.

Figure 2:
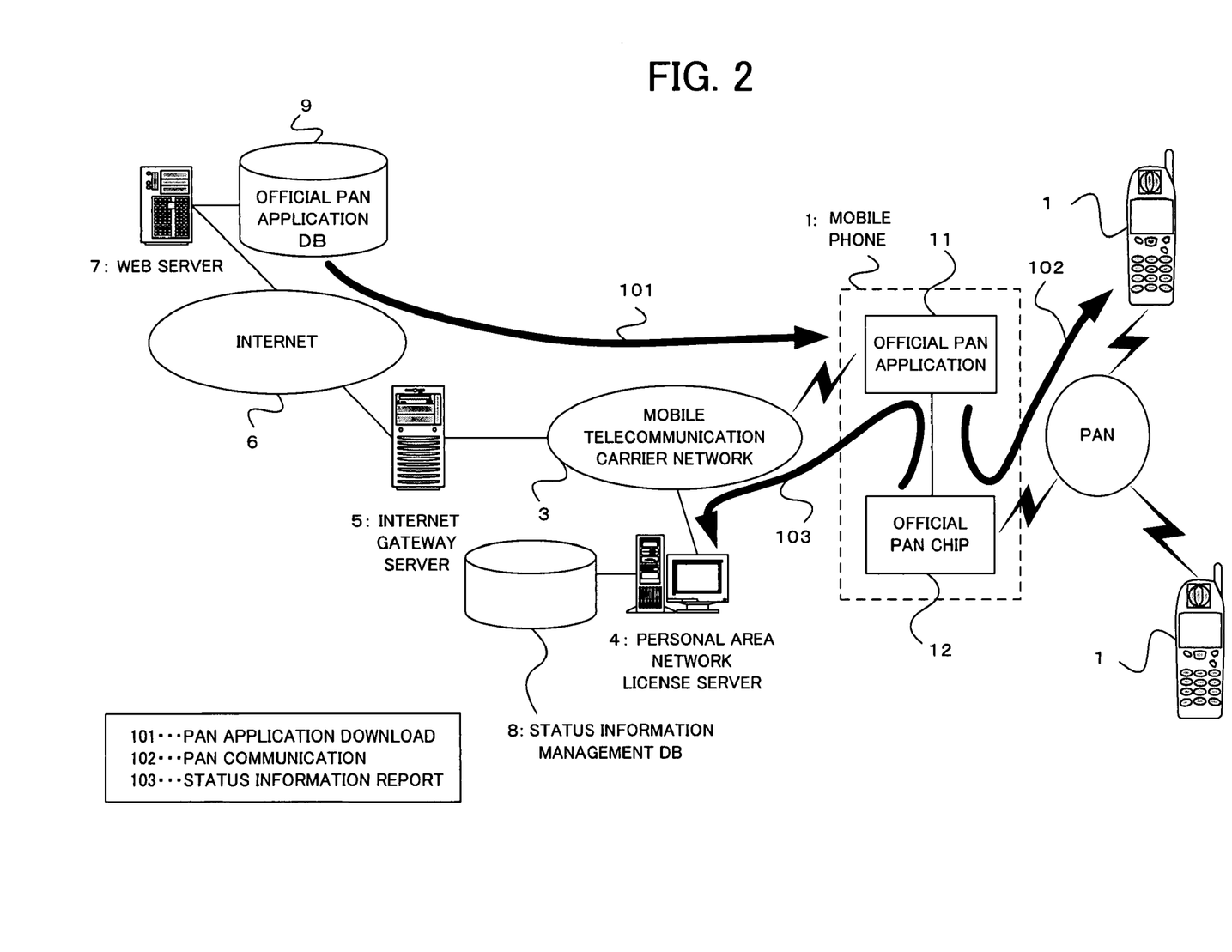
FIG. 2 is a diagram showing an operation condition of the communication management system shown in FIG. 1.

Details thereof will be explained below. FIG. 2 schematically shows a configuration of a communication system including the PAN management function. As shown in FIG. 2, the mobile phone 1 includes an official PAN application 11 and an official PAN chip 12 as portions of the PAN management function. Though the mobile phone 1 includes a function for the information communication via the normal mobile telecommunication carrier network 3 in addition to the PAN management function, they are well known, so the explanation thereof is omitted here.

The official PAN application 11 is executed on the mobile phone 1, and is the proper application whose execution on the PAN 2 is permitted by the mobile telecommunication carrier. The official PAN application 11 is supplied from a specific service provider to the user of the mobile phone 1, and is created by using a dedicated development tool and the like after the service provider obtains the permission from the mobile telecommunication carrier and the like. When the official PAN application 11 is executed on the mobile phone 1, the mobile phone 1 can wirelessly communicate with another mobile phone 1 via the PAN 2 during the execution of the application.

The service provider of the official PAN application 11 can distribute the official PAN application to the users on the Web server 7 on the Internet 6, for example. Concretely, as shown in FIG. 2, various official PAN applications 11 are stored in the database 9 connected to the Web server 7. By operating the mobile phone 1, the user who desires to obtain the official PAN application 11 can connect the mobile phone 1 to the Web server 7 via the mobile telecommunication carrier network 3, the gateway server 5 and the Internet 6, and can designate the desired official PAN application to download it to the mobile phone 1 (see an arrow 101 shown in FIG. 2). As another method, it is possible that various official PAN applications 11 provided by each service provider are stored on the license server 4 managed by the mobile telecommunication carrier, and that the user obtains the various official PAN applications 11 from the license server 4. In this case, the license server 4 serves as a portal site of the official PAN application. In addition, the official PAN application may be preinstalled on the mobile phone 1.

Figure 3A:
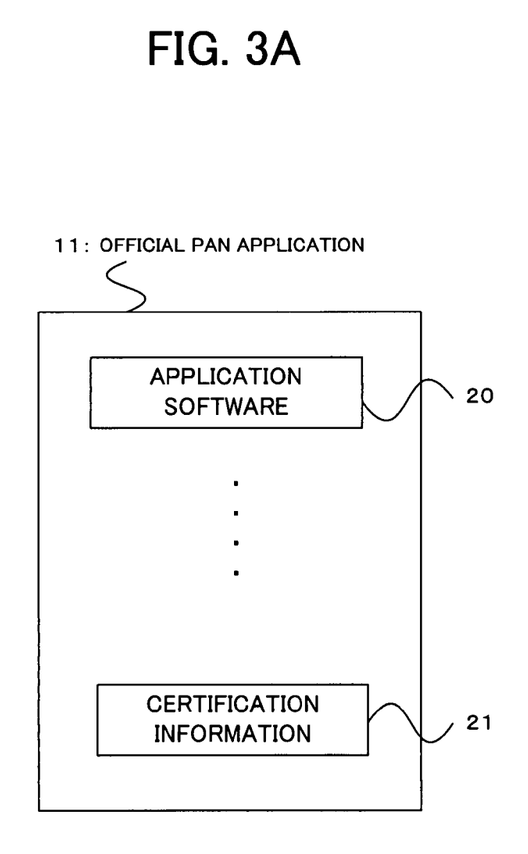
FIG. 3A shows an example of a configuration of an official PAN application.

FIG. 3A schematically shows a configuration of the official PAN application 11. The official PAN application 11 includes certification information 21 certifying that the official PAN application is proper (i.e., the official PAN application is created under the permission of the mobile telecommunication carrier), in addition to application software 20 for executing a predetermined process by executing the wireless communication on the PAN 2.

As the PAN management function, the mobile phone 1 includes the official PAN chip 12 as shown in FIG. 2. The official PAN chip 12 is loaded into the mobile phone 1 in a form of a semiconductor chip at the time of selling, and manages the communication of the mobile phone 1 on the PAN 2 by executing the necessary communication and process with the official PAN application 11 and the license server 4.

Figure 3B:
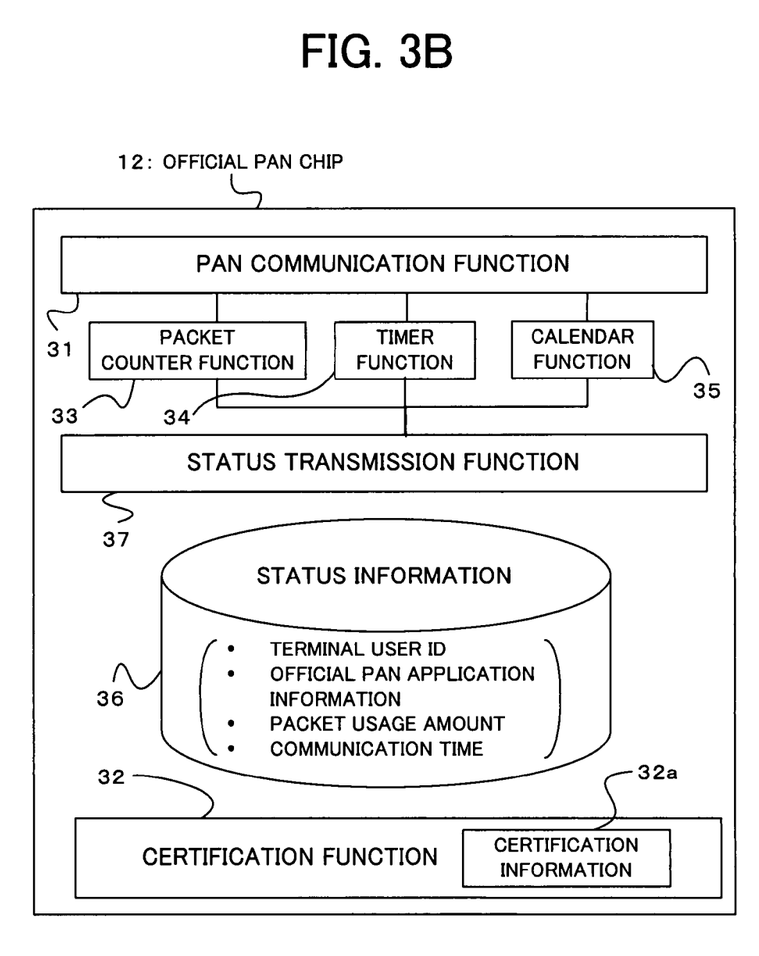
FIG. 3B shows an example of a configuration of an official PAN chip.

FIG. 3B schematically shows a configuration of the official PAN chip 12. As shown in FIG. 3B, the official PAN chip 12 includes a PAN communication function 31, a packet counter function 33, a timer function 34, a calendar function 35, a certification function 32 having certification information 32a, a status information storage unit 36 and a status transmission function 37.

The PAN communication function 31 is a necessary basic function so that the mobile phone 1 executes the communication on the PAN 2. The packet counter function 33 obtains a communication packet amount in a case that the mobile phone 1 executes the information communication on the PAN 2. The timer function 34 is a dedicated clock function which maintains a standard time in the official PAN chip 12, and is unalterable from outside. The timer function 34 can obtain a communication time on the PAN 2 by the mobile phone 1 on the basis of the standard time. The calendar function 35 manages a period such as an information obtaining period on the basis of the standard time included in the timer function 34.

The certification function 32 executes a certification process with the official PAN application 11. The certification process determines whether or not the application installed into the mobile phone 1 is the proper official PAN application 11, i.e., whether or not the wireless communication on the PAN 2 can be permitted. Concretely, the certification function 32 performs the certification by using the certification information 21 in the official PAN application 11 and the certification information 32a inside the official PAN chip.

It is now assumed that when the user executes a certain application (referred to as "uncertain application" for convenience) installed into the mobile phone 1, the uncertain application involves the communication on the PAN 2. In this case, the certification function 32 in the official PAN chip 12 requests the certification information to the uncertain application. If the uncertain application is the official PAN application, since the application includes the certification information 21 inside, the official PAN chip executes the certification process by using the certification information 21. As a result, when the uncertain application is certified as the official PAN application, the official PAN chip 12 enables the PAN communication function 31, and permits that the official PAN application executes the information communication on the PAN 2 (see an arrow 102 shown in FIG. 2). On the contrary, when the uncertain application is not the official PAN application, the official PAN chip 12 fails the certification. Therefore, the official PAN chip 12 disables the PAN communication function 31, and inhibits the uncertain application from executing the information communication on the PAN 2.

According to the certification function 32, a management system can be realized, in which only the official PAN application 11 created on condition of an proper process to the mobile telecommunication carrier is permitted to execute the information communication on the PAN 2. As a certification method by the certification function 32, various certification techniques such as a public key encryption system are applicable.

The status information storage unit 36 stores status information relating to the communication of the mobile phone 1 on the PAN 2. The status information includes official PAN application information for identifying the official PAN application used by the user, the packet usage amount and communication time of the information communication which the user executes on the PAN 2 by executing the official PAN application, in addition to a terminal user ID assigned to the user of the mobile phone 1 by the mobile telecommunication carrier. It is noted that the official PAN application information can be obtained from the official PAN application 11. In addition, the packet usage amount can be obtained by the packet counter function 33, and the communication time can be obtained by the timer function 34. Therefore, whenever the user executes the official PAN application by using the mobile phone 1 and executes the information communication on the PAN 2, the status information is updated and stored into the status information storage unit 36.

Figure 5:
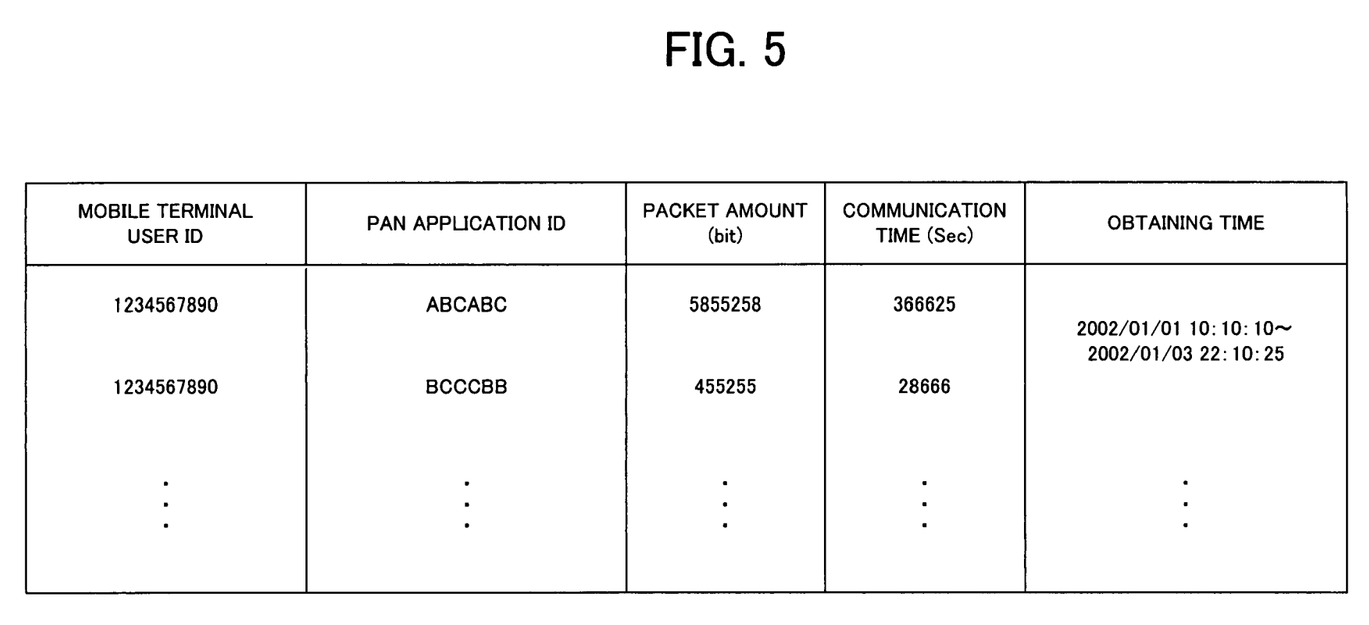
FIG. 5 is an example of status information obtained by the optical PAN chip.

When the mobile phone 1 can communicate with the mobile telecommunication carrier network 3, the status information transmission unit 37 regularly transmits the status information in the status information storage unit 36 to the license server 4 (see an arrow 103 shown in FIG. 2). As shown in FIG. 2, the license server 4 includes the status information management database (DB) 8, and stores the status information transmitted from each mobile phone 1 for each user. The license server 4 can thus manage the information communication of each mobile phone 1 on the PAN 2. FIG. 5 shows an example of the status information stored in the status information management DB 8.

Additionally, based on the status information obtained by the license server 4, the mobile telecommunication carrier can charge the fee for the usage of the official PAN application by the user. There are various charging methods. For example, when the official PAN application is supplied from the service provider to the user of the mobile phone 1 free of charge, the mobile telecommunication carrier can charge, to the service provider, a predetermined amount of money to the number of using the official PAN application per month. Further, when the pay official PAN application is supplied to the user of the mobile phone 1, it is also possible that the mobile telecommunication carrier obtains the fee for use from the user and pays a portion of the fee for use to the service provider as the fee for use of the official PAN application. There are plural models of the charging, and in the system of the present invention, both of a fixed charge system and a per unit charge system are applicable.

Figure 4A:
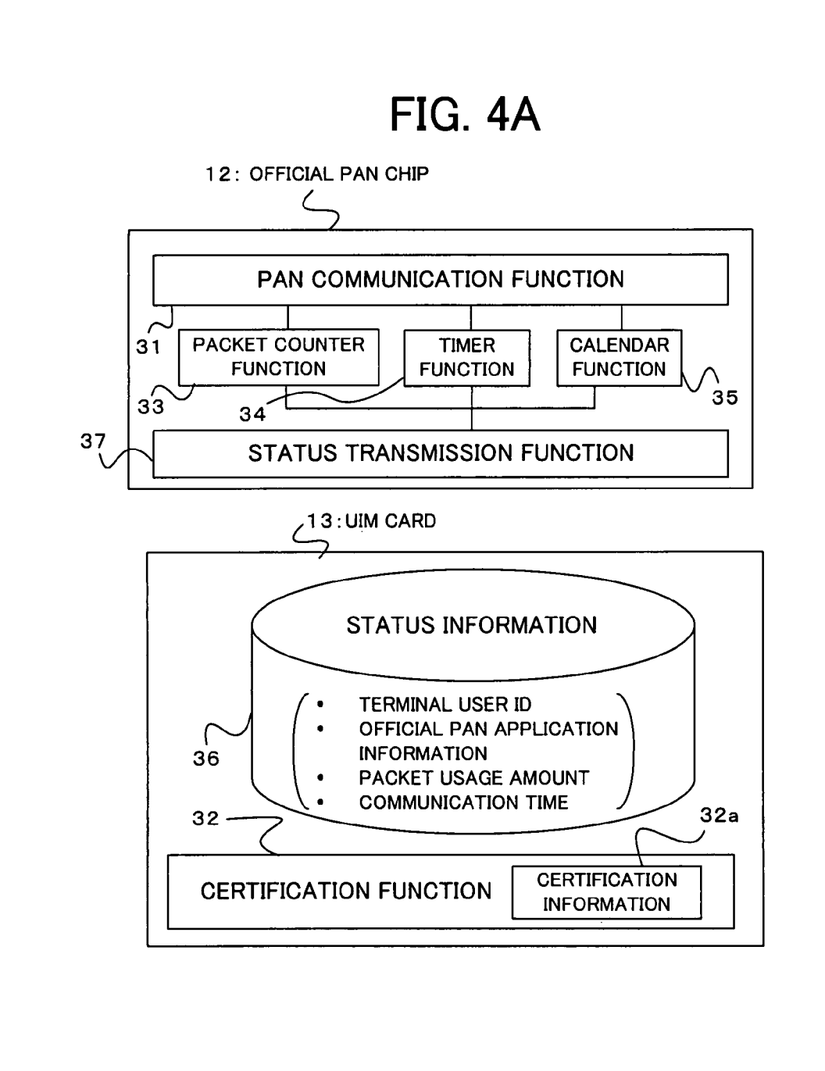
FIG. 4A shows another example of the official PAN chip.
Figure 4B:
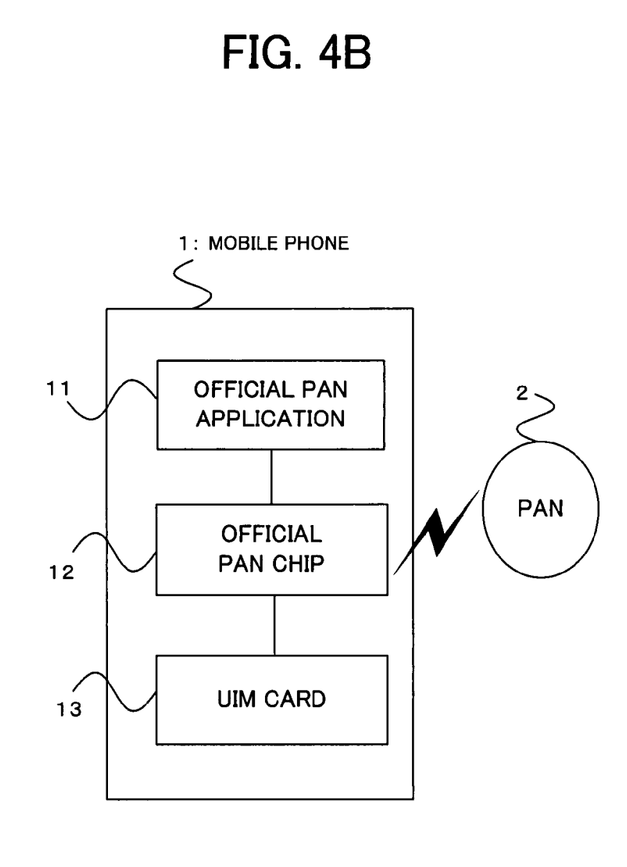
FIG. 4B shows a configuration of a correspondent mobile phone.

Recently, a user identity module card (hereinafter referred to as "UIM card") serving as a device storing user information in the mobile phone 1 is sometimes loaded. A UIM card 13 is a storage device storing subscriber information such as a phone number and security information, like an IC card. Thus, when the UIM card 13 is loaded into the mobile phone 1, as shown in FIG. 4A, the status information storage unit 36 and the certification function 32 in the above-mentioned official PAN chip 12 can be realized by a subscriber information storage area and a security function of the UIM card 13. In that case, as shown in FIG. 4B, the official PAN chip 12 operates with the UIM card 13, and manages the information communication on the PAN 2 of the official PAN application. It is noted that each function included in the official PAN chip 12, such as the regular transmission of the status information to the license server 4, is executed similarly to the case of the mobile phone 1 having no UIM card 13.

Figure 6:
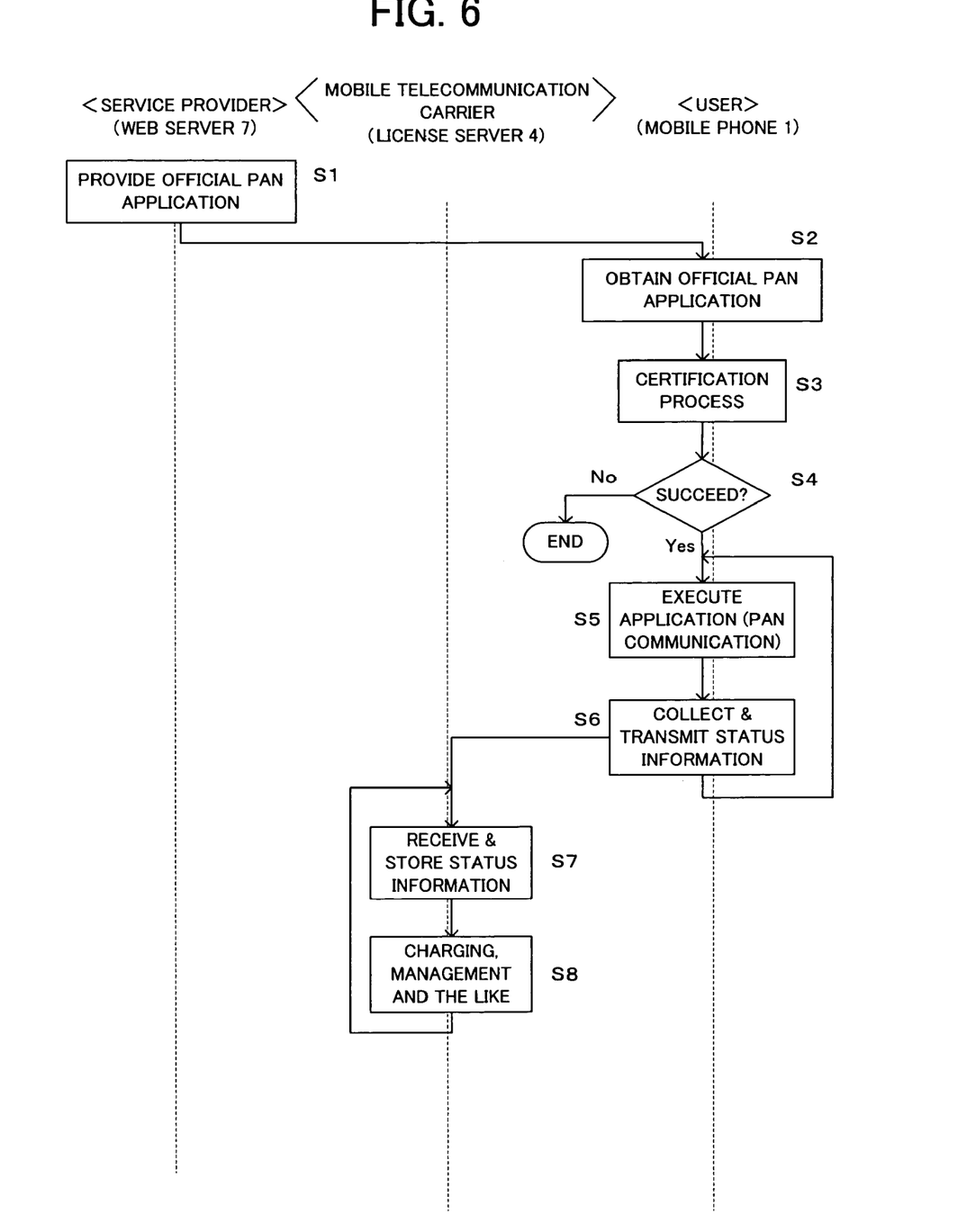
FIG. 6 is a flow chart of a process by the communication management system of the present invention.

Next, a flow of a process in the present system will be explained with reference to FIG. 2 and FIG. 6. FIG. 6 is a flow chart showing a process in a case that the user executes the official PAN application by using the mobile phone 1.

The service provider provides the official PAN application by using the Web server 7 and the like (step S1). The user connects the mobile phone 1 to the Web server 7, and downloads the desired official PAN application 11 into the mobile phone 1 (step S2). When the user starts up the official PAN application 11, the official PAN chip 12 in the mobile phone 1 certifies the official PAN application 11 by the certification function 32 (step S3). When the application is not proper, since the certification by the official PAN chip 12 fails (step S4; No), the execution of the application is inhibited.

When the certification succeeds (step S4; Yes), the official PAN chip 12 permits the execution of the official PAN application 11, and the official PAN application 11 executes the wireless information communication on the PAN 2 (step S5). During the execution, the official PAN chip 12 collects and stores the status information, and regularly transmits it to the license server 4 (step S6).

The license server 4 receives the status information and stores it into the status information DB 8 (step S7). At the same time, the license server 4 executes the charging and other necessary process based on the status information (step S8).

As explained above, according to the present invention, the mobile telecommunication carrier can put a certain limit on the communication on the PAN executed without passing through the mobile telecommunication network to manage the execution. At the same time, the mobile telecommunication carrier can obtain the communication information and can use it for the charging and the like. Therefore, the benefit of the mobile telecommunication carrier is never lost, and the mobile telecommunication carrier network and the wireless communication network can be compatible with each other.

INDUSTRIAL APPLICABILITY

This invention can be used for the wireless communication executed by the mobile terminal such as the mobile phone.

The invention claimed is:

1. A communication management system comprising:
   a server device; and
   a mobile terminal device capable of communicating with the server device via a mobile telecommunication carrier network,
   wherein the mobile terminal device includes:
   a wireless communication unit which communicates with another terminal device by wireless communication without passing through the mobile telecommunication carrier network;
   an application which executes a process including the wireless communication by the wireless communication unit, the application including first certification information indicating that the application is proper; and
   a control unit which determines whether or not the application is proper, and permits an execution of the wireless communication by the application only when the application is proper,
   wherein the control unit includes second certification information, and determines whether or not the application is proper based on the first certification information included in the application and the second certification information included in the control unit, such that the determination is made without passing through the mobile telecommunication carrier network.

2. The communication management system according to claim 1, wherein the control unit includes:
   a communication amount detecting unit which detects a packet communication amount of the wireless communication by the wireless communication unit; and
   a status information transmission unit which obtains status information indicating an execution condition of the wireless communication and including identification information of the mobile terminal device, identification information of the application and the packet communication amount, and transmits the status information to the server device via the mobile telecommunication carrier network, and
   wherein the server device generates charge information relating to the wireless communication by the mobile terminal device based on the status information.

3. A mobile terminal device capable of communicating with a server device via a mobile telecommunication carrier network, comprising:
   a wireless communication unit which communicates with another terminal device by wireless communication without passing through the mobile telecommunication carrier network;
   an application which executes a process including the wireless communication by the wireless communication unit, the application including first certification information indicating that the application is proper; and
   a control unit which determines whether or not the application is proper, and permits an execution of the wireless communication by the application only when the application is proper,
   wherein the control unit includes second certification information, and determines whether or not the application is proper based on the first certification information included in the application and the second certification information included in the control unit, such that the determination is made without passing through the mobile telecommunication carrier network.

4. The mobile terminal device according to claim 3, wherein the control unit includes a status information transmission unit which obtains status information indicating an execution condition of the wireless communication and transmits the status information to the server device via the mobile telecommunication carrier network.

5. The mobile terminal device according to claim 4, wherein the control unit includes a communication amount detecting unit which detects a packet communication amount of the wireless communication by the wireless communication unit, and
   wherein the status information transmission unit transmits the status information including identification information of the mobile terminal device, identification information of the application and the packet communication amount.

6. A computer program product in a computer-readable medium encoded with instructions capable of being executed by a mobile terminal device capable of communicating with a server device via a mobile telecommunication carrier network and communicating with another terminal device by wireless communication without passing through the mobile telecommunication carrier network, the computer program product making the mobile terminal device function as a control unit which determines whether or not an application loaded into the mobile terminal device for executing a process including the wireless communication is proper, and permits an execution of the wireless communication by the application only when the application is proper, wherein the application includes first certification information indicating that the application is proper, and wherein the control unit includes second certification information, and determines whether or not the application is proper based on the first certification information included in the application and the second certification information included in the control unit, such that the determination is made without passing through the mobile telecommunication carrier network.

* * * * *